(12) United States Patent
Harrington

(10) Patent No.: US 9,184,912 B2
(45) Date of Patent: Nov. 10, 2015

(54) SECURE QUANTUM AUTHENTICATION SYSTEM

(75) Inventor: James William Harrington, Moorpark, CA (US)

(73) Assignee: THE BOEING COMPANY, Chicago, IL (US)

( * ) Notice: Subject to any disclaimer, the term of this patent is extended or adjusted under 35 U.S.C. 154(b) by 239 days.

(21) Appl. No.: 13/449,029

(22) Filed: Apr. 17, 2012

(65) Prior Publication Data

US 2013/0275757 A1 Oct. 17, 2013

(51) Int. Cl.
*G06F 21/00* (2013.01)
*H04L 9/08* (2006.01)

(52) U.S. Cl.
CPC ..................... *H04L 9/0852* (2013.01)

(58) Field of Classification Search
CPC ..................................................... H04L 9/0852
See application file for complete search history.

(56) References Cited

U.S. PATENT DOCUMENTS

| | | | | |
|---|---|---|---|---|
| 5,307,410 | A * | 4/1994 | Bennett ........................ | 380/256 |
| 5,515,438 | A * | 5/1996 | Bennett et al. ................ | 380/278 |
| 5,675,648 | A * | 10/1997 | Townsend ..................... | 380/278 |
| 5,764,765 | A * | 6/1998 | Phoenix et al. ............... | 380/283 |
| 5,768,378 | A * | 6/1998 | Townsend et al. ............ | 380/256 |
| 5,850,441 | A * | 12/1998 | Townsend et al. ............ | 380/283 |
| 6,188,768 | B1 * | 2/2001 | Bethune et al. ............... | 380/278 |
| 6,272,224 | B1 * | 8/2001 | Mazourenko et al. ........ | 380/283 |
| 7,881,473 | B2 | 2/2011 | Wang et al. | |
| 2006/0059343 | A1 * | 3/2006 | Berzanskis et al. ........... | 713/171 |
| 2007/0071245 | A1 * | 3/2007 | Kuang ........................... | 380/278 |
| 2010/0299526 | A1 | 11/2010 | Wiseman et al. | |
| 2011/0085666 | A1 | 4/2011 | Hicks | |
| 2011/0142242 | A1 * | 6/2011 | Tanaka .......................... | 380/282 |
| 2011/0213979 | A1 | 9/2011 | Wiseman et al. | |

OTHER PUBLICATIONS

Gottesman et al.; Security of quantum key distribution with imperfect devices; Published in: Information Theory, 2004. ISIT 2004. Proceedings. International Symposium on; Date of Conference: Jun. 27-Jul. 2, 2004; IEEE Xplore.*

Jana et al.; On the effectiveness of secret key extraction from wireless signal strength in real environments; Published in: Proceeding MobiCom '09 Proceedings of the 15th annual international conference on Mobile computing and networking; 2009; pp. 321-332; ACM Digital Library.*

"ANU Quantum Optics; Secure Quantum Communication", Australian National University, Mar. 2012, 2 Pages, accessed Mar. 15, 2012, http://photonics.anu.edu.au/qoptics/Research/securequantumcom.html.

Hwang et al., "Quantum cryptography without public announcement bases," Phys.Lett. A244 (1998), 4 Pages (arXiv:quant-ph/9702009v5), accessed Apr. 12, 2012, http://arxiv.org/pdf/quant-ph/9702009v5.pdf.

(Continued)

*Primary Examiner* — Bradley Holder
(74) *Attorney, Agent, or Firm* — Yee & Associates, P.C.

(57) ABSTRACT

A method and apparatus for sharing information. First bits are selected from a shared secret key in a first device. The first bits have a selected length. Second bits with the selected length in signals are sent from the first device to a second device. The signals have selected types of properties based on the first bits. The second bits are encoded in states for the selected types of properties. A key is generated in the first device. The key is based on the second bits received at the second device having the selected types of properties identified as matching expected types of properties.

20 Claims, 6 Drawing Sheets

(56) References Cited

OTHER PUBLICATIONS

Damgaard et al., "Cryptography in the Bounded Quantum-Storage Model", Proceedings of the 46th IEEE Symposium on Foundations of Computer Science, Oct. 2005, 10 Pages (arXiv.quant-ph/0508222v2), accessed Apr. 12, 2012, http://homepages.cwi.nl/~fehr/mypapers/DFSS05.pdf.

Wehner et al., "Cryptography from Noise Storage", Phys.RevLett 100 220502 (2008), 13 Pages (arXiv:0711.2895v3), accessed Apr. 12, 2012, http://arxiv.org/pdf/0711.2895v3.pdf.

\* cited by examiner

SECURE QUANTUM AUTHENTICATION SYSTEM

BACKGROUND INFORMATION

1. Field

The present disclosure relates generally to exchanging information and, in particular, to generating keys for use in exchanging information. Still more particularly, the present disclosure relates to a method and apparatus for generating a key for exchanging information without revealing a secret key.

2. Background

In exchanging information, some information sent between devices may be considered confidential, secret, or sensitive. Information may be sent between devices in a manner that does not allow other parties to see the information. The information is typically encrypted in a first device using an encryption process. The encrypted information is then sent to a second device. The second device then decrypts the information. Encryption is typically performed using an encryption process in which a key is used to encrypt the information. The second device also needs to have the key to decrypt the information as well as knowing the encryption process used.

Many different systems are present for encrypting information. For example, public key cryptography is commonly used by many companies to perform secure transactions. These transactions may include transferring funds, providing clients secure access to accounts, and other suitable purposes. Protocols using public keys may not be as secure as desired. An eavesdropper may view the encrypted information and use sophisticated processes to decrypt the information.

Private key cryptography may provide a more secure process for exchanging information. A weakness in processes that use private keys is the fact that the key needs to be shared between two devices exchanging information. If an unauthorized party is able to intercept the key being transmitted between two devices, then the unauthorized party may be able to access encrypted information sent between the two devices. Therefore, it would be desirable to have a method and apparatus that takes into account at least some of the issues discussed above, as well as other possible issues.

SUMMARY

In one illustrative embodiment, a method for sharing information is present. First bits are selected from a shared secret key in a first device. The first bits have a selected length. Second bits with the selected length in signals are sent from the first device to a second device. The signals have selected types of properties based on the first bits. The second bits are encoded in states for the selected types of properties. A key is generated in the first device. The key is based on the second bits received at the second device having the selected types of properties identified as matching expected types of properties.

In another illustrative embodiment, a method for generating a key is present. First bits are selected from a shared secret key in a first device using a pseudorandom process. The first bits have a selected length. Second bits having the selected length are randomly generated. The second bits with the selected length in photons are sent from the first device to a second device. The photons have a basis based on the first bits. The second bits are encoded in states for selected types of properties. A remaining number of the second bits received by the second device identified as having selected types of properties corresponding to expected types of properties for second bits encoded in the states of the selected types of properties is retained. A key is generated using the remaining number of the second bits.

In yet another illustrative embodiment, a system comprises a first device. The first device is configured to select first bits from a shared secret key. The first bits have a selected length. The first device is further configured to send second bits with the selected length in signals from the first device to a second device. The signals have selected types of properties based on the first bits. The second bits are encoded in states for the selected types of properties. The first device is further configured to generate a key in the first device. The key is based on the second bits received at the second device having the selected types of properties identified as matching expected types of properties.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION

Figure 1:
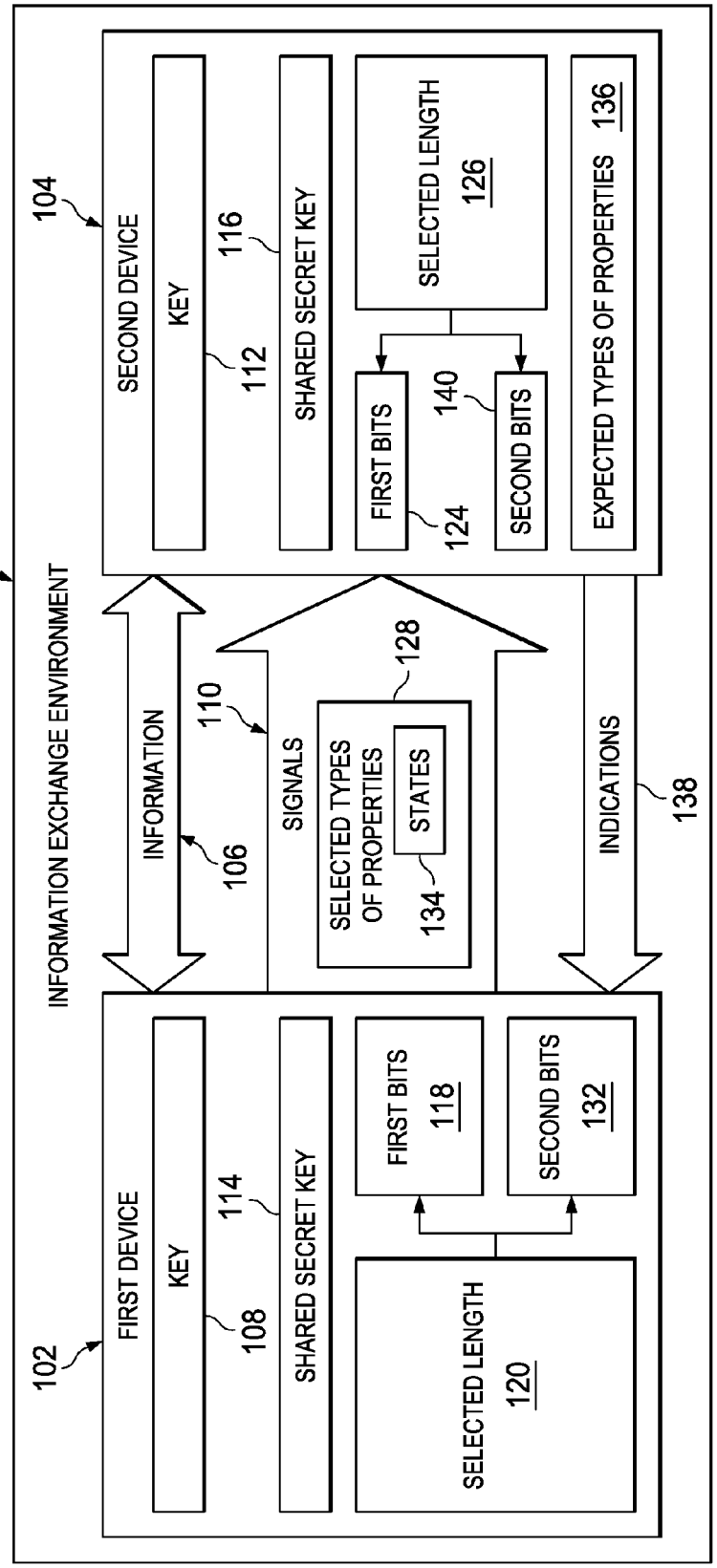
FIG. 1 is an illustration of a block diagram of an information exchange environment in accordance with an illustrative embodiment.

The illustrative embodiments recognize and take into account one or more different considerations. For example, the illustrative embodiments recognize and take into account that one manner in which keys may be distributed more securely is through the use of quantum key distribution systems. With a quantum key distribution system, a key is sent from a first device to a second device in a manner that allows the second device to determine whether an unauthorized party has examined the key. This type of process relies on a no-cloning principle.

For example, the key may be sent as bits in which the bits have properties with known states. For example, the bits may be sent from the first device to the second device as signals using photons. Each bit may be encoded in a single photon. The bit may be encoded based on the intensity, frequency, or other property of the photon.

The photons encoding the bits have property with a selected state. This property may be, for example, a basis that takes the form of polarization. One type of basis for polarization is circular polarization. With this type of basis, the state may be, for example, right circular polarization or left circular polarization.

When a photon is sent with a bit from the key encoded in the photon, the selected state of the photons is also known to both devices. The selected state may be, for example, right circular polarization for a particular bit.

The first device transmits the photon with right circular polarization. If the state of the photon received does not have the right circular polarization as a state, then the photon may have been examined by another party. As a result, an unauthorized party examining signals encoding bits for a key may be identified.

The illustrative embodiments recognize and take into account that although this type of key distribution may be secure, this type of distribution does not take into account authenticating the devices. For example, a determination needs to be made as to whether the second device receiving the key is the device that should be receiving the key. In other words, a determination needs to be made as to whether the second device is what the second device says that it is for receiving information. The current quantum key distribution systems do not take this issue into account.

Thus, the illustrative embodiments provide a method and apparatus for sharing information. In particular, the illustrative embodiments provide a method and apparatus for an authentication process. This authentication process may be performed as part of a process for generating a key for use in exchanging information.

In one illustrative embodiment, first bits are selected from a shared secret key in a first device. The first bits have a selected length. Second bits are sent with the selected length in signals from the first device to the second device. The signals have selected types of properties that are selected based on the first bits. The second bits are encoded in states for the selected types of properties. A key is generated in the first device in which the key is based on the second bits received at the second device having the selected types of properties identified as matching expected types of properties.

The second device also generates the first bits from the shared secret key in the second device. As signals are received, the first bits are used to identify expected types of properties for the signals that are received by the second device. These expected types of properties are the same as the selected types of properties when the first device and the second device have the same shared secret key.

Signals having the expected types of properties are identified and indications are made to the first device that the signals have been received. The second device also generates the key using the second bits received as having the identified types of properties matching the expected types of properties.

As a result, authentication may only occur when both the first device and the second device have the shared key. For example, if the second device does not have the shared key, the second device may not generate the same key as the first device. Thus, if the second device is an unauthorized device, the second device will be unable to examine any information encrypted by the first device.

With reference now to the figures and, in particular, with reference to FIG. 1, an illustration of an information exchange environment is depicted in accordance with an illustrative embodiment. Information exchange environment 100 includes first device 102 and second device 104. First device 102 and second device 104 are hardware devices and may also include software.

First device 102 and second device 104 may exchange information 106. In these illustrative examples, first device 102 and second device 104 may take various forms. For example, first device 102 and second device 104 may be data processing systems, such as tablet computers, personal computers, mobile phones, and other suitable types of devices. In yet other illustrative examples, first device 102 may be a smart card, and second device 104 may be a smart card reader. In yet another example, first device 102 may be an identification badge, and second device 104 may be a badge reader. In other words, first device 102 and second device 104 may be any devices configured to exchange information 106.

Information 106 may be encrypted to prevent other devices from examining information 106 sent between first device 102 and second device 104. In these illustrative examples, the encryption may be performed by generating key 108 prior to exchanging information 106.

In this illustrative example, key 108 is generated by first device 102. Signals 110 may be sent from first device 102 to second device 104 that allow second device 104 to generate key 112.

In these illustrative examples, key 112 is the same as key 108 if second device 104 is authenticated. In other words, second device 104 only generates key 112 correctly if second device 104 is authenticated. In these illustrative examples, this authentication occurs if shared secret key 114 in first device 102 and shared secret key 116 in second device 104 are the same. If shared secret key 116 is not the same as shared secret key 114, key 112 will not be the same as key 108. As a result, second device 104 is unable to decrypt any of information 106 that is encrypted by first device 102 using key 108.

In these illustrative examples, shared secret key 114 and shared secret key 116 may be previously shared between first device 102 and second device 104. These shared secret keys may be used for authentication without revealing the shared secret keys in the illustrative examples.

In one illustrative example, first device 102 generates first bits 118. First bits 118 have selected length 120. In these illustrative examples, first bits 118 are selected from shared secret key 114 in first device 102. These bits may be selected in a number of different ways. As depicted, first bits 118 are selected by first device 102. As depicted, first device 102 may include a selection process for use in selecting first bits 118 from shared secret key 114. The selection process may be, for example, a pseudorandom process, such as a pseudorandom number generator.

Values generated by the pseudorandom number generator are used to select bits from shared secret key 114. For example, a value generated by the pseudorandom number generator may be used to identify a position of a bit in shared secret key 114 for use in first bits 118. Values may be generated and bits selected from shared secret key 114 until first bits 118 have selected length 120. The selection may be performed such that an identification of shared secret key 114 from first bits 118 is unlikely to occur.

Second device 104 also generates first bits 124 with selected length 126. Selected length 126 is the same length as selected length 120. First bits 124 will match first bits 118 if second device 104 uses the same selection process as first device 102 and if shared secret key 116 is the same as shared secret key 114. For example, if second device 104 uses the same pseudorandom process with the seed number as in first device 102, the same values will be generated such that the selection of first bits 124 from shared secret key 116 will be the same as the selection of first bits 118 from shared secret key 114.

In these illustrative examples, first bits 118 identify selected types of properties 128 for signals 110. In these illustrative examples, signals 110 may be comprised of particles, such as photons, electrons, or other suitable particles. Selected types of properties 128 are types of properties for these particles that are selected using first bits 118.

For example, if signals 110 are comprised of photons, then selected types of properties 128 may be, for example, types of polarization. In this example, selected types of properties 128 for polarization may be, for example, linear polarization, circular polarization, and elliptical polarization.

Thus, each bit in first bits 124 identifies a selected type of property in selected types of properties 128 for use in transmitting a signal in signals 110. First bits 118 and first bits 124 may be used for authentication between first device 102 and second device 104 in these illustrative examples.

First device 102 also generates second bits 132 with selected length 120. In other words, the number of bits in second bits 132 is the same as the number of bits in first bits 118 and first bits 124.

First device 102 may also include a process that generates second bits 132 without using shared secret key 114. In these illustrative examples, second bits 132 may be generated in a number of different ways. For example, second bits 132 may be a random number. Second bits 132 are encoded into signals 110 for transmission to second device 104.

As depicted, second bits 132 are encoded into signals 110. More specifically, second bits 132 are encoded into states 134 for selected types of properties 128 as identified using first bits 118.

For example, a state in states 134 may be, for example, right circular polarization or left circular polarization if the selected type of property in selected types of properties 128 is circular polarization. As discussed above, the selected type of property is based on a bit in first bits 118.

Thus, if a bit in second bits 132 is a logic 0, the state may be set as right circular polarization. If the bit is a logic 1, the state may be set as left circular polarization. Of course, the encoding of the bit may be setting the state to a left circular polarization for a logic 1 and a right circular polarization for a logic 0.

If the selected type of property for the bit in second bits 132 is linear polarization, the states may be vertical polarization and horizontal polarization. In one illustrative example, the logic 1 may be encoded by setting the state of the photon to vertical polarization, and the logic 0 may be set by setting the state to horizontal polarization.

In these illustrative examples, second bits 132 with selected length 120 are sent in signals 110 from first device 102 to second device 104 in which signals 110 have selected types of properties 128 based on first bits 118 with states 134 encoding second bits 132. Second device 104 receives signals 110. Second device 104 indicates whether selected types of properties 128 for signals 110 encoding second bits 132 have expected types of properties 136. In these illustrative examples, indications 138 are sent to first device 102 from second device 104.

For example, when second device 104 receives signals 110, second device 104 identifies second bits 140 from states 134 in selected types of properties 128 for signals 110. Additionally, second device 104 determines whether selected types of properties 128 for signals 110 have expected types of properties 136. In other words, if first bits 118 are not the same as first bits 124, the selected type of property for a signal as selected by first device 102 may not match the expected type of property for that signal as identified by second device 104.

Second device 104 retains second bits 140 having selected types of properties 128 that are expected types of properties 136. First device 102 retains second bits 132 based on indications 138 made by second device 104.

First device 102 then generates key 108, and second device 104 generates key 112. These keys may be generated using a hash function or another suitable key generation process.

Further, if an unauthorized device intercepts some or all of signals 110, examination of signals 110 does not provide any information about shared secret key 114. If the unauthorized device is able to identify states 134 in signals 110, the unauthorized device is unable to identify shared secret key 114 because states 134 are selected from first bits 118. First bits 118 are selected using a pseudorandom process that makes identification of shared secret key 114 unlikely as compared to other systems.

Also, if second device 104 detects a sufficient number of second bits 140 not having expected types of properties 136, a potential unauthorized device may be examining signals 110. As a result, first device 102 and second device 104 may then halt generating key 108 and key 112. Of course, first device 102 and second device 104 may continue to generate key 108 and key 112, because these keys are generated from second bits 132 encoded in signals 110 that have not been examined by another device.

In another example, if second device 104 is not an authorized device, second device 104 will not have shared secret key 116 that is the same as shared secret key 114. As a result, second device 104 will not generate first bits 124 that are the same as first bits 118 as generated by first device 102.

Key 108 and key 112 will be the same if shared secret key 114 in first device 102 and shared secret key 116 in second device 104 are the same. Further, the process used in first device 102 for selecting first bits 118 and the process used in second device 104 for selecting first bits 124 also are the same if key 108 generated by first device 102 and key 112 generated by second device 104 are the same. If shared secret key 116 in second device 104 is not the same as shared secret key 114 in first device 102, second device 104 is unable to know what types of properties should be expected in selected types of properties 128 for signals 110. As a result, second device 104 is unable to identify the correct value for second bits 140 when generating second bits 140 from states 134 in signals 110. In this manner, the authentication of first device 102 and second device 104 may be performed using a shared key, such as shared secret key 114 and shared secret key 116.

In the illustrative examples, an unauthorized device will be unable to learn the polarization basis used by first device 102 and second device 104. For example, an unauthorized device is unable to determine whether the basis used for a photon is circularly or linearly polarized from a single particle. As a result, an unauthorized device cannot reliably learn the encoded random bits, since the unauthorized device can only guess which basis is used to measure the photon.

In the illustrative examples, first device 102 and second device 104 do not directly learn about the presence of an unauthorized device in a signal-by-signal manner. Rather, first device 102 and second device 104 detect the presence of the unauthorized party by the fact that the raw bits determined by first device 102 and second device 104 during the protocol disagree to such a large extent that first device 102 and second device 104 end up with different keys at the end of the process.

Figure 2:
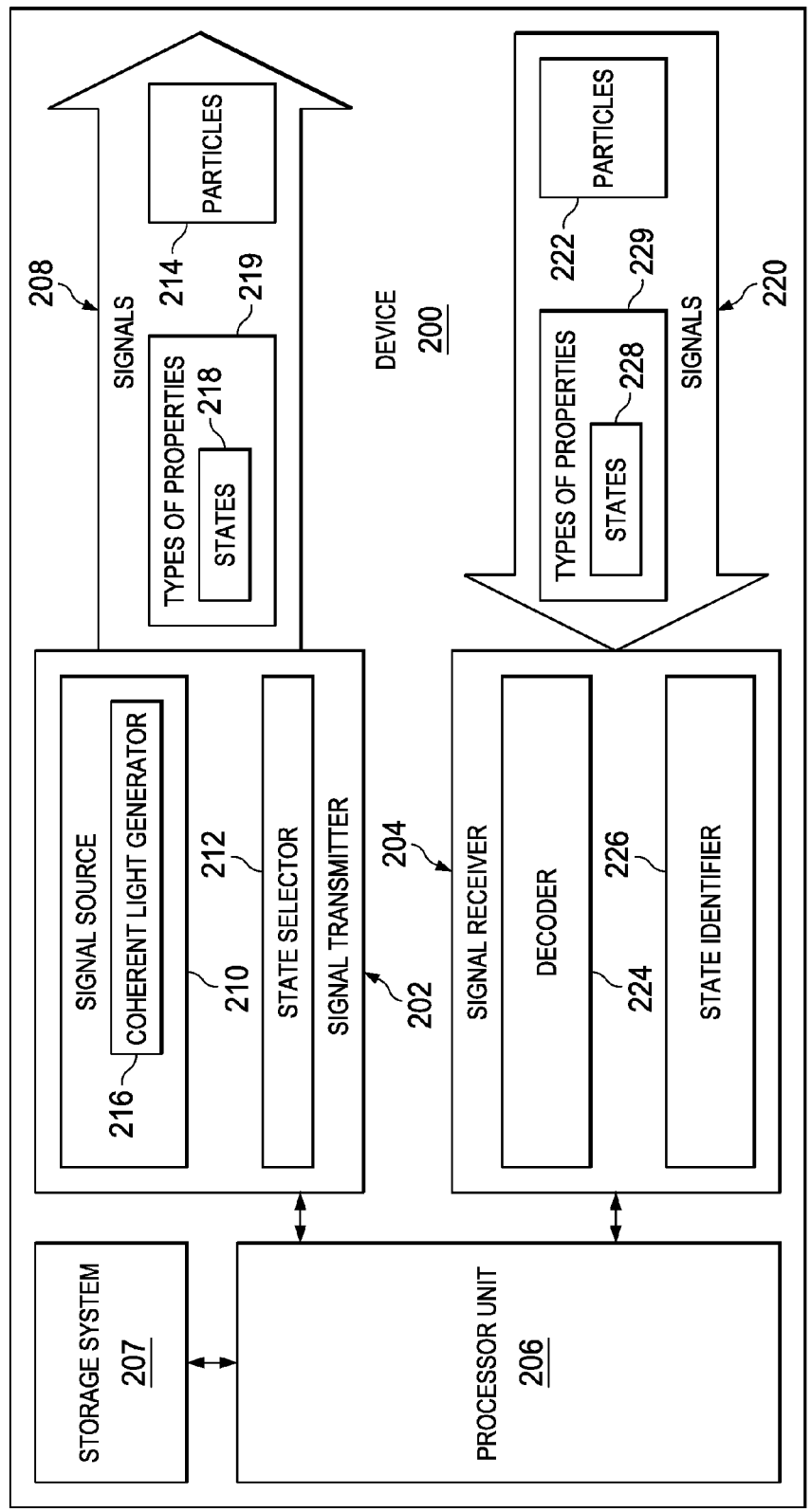
FIG. 2 is an illustration of a block diagram of a device in accordance with an illustrative embodiment.

Turning now to FIG. 2, an illustration of a device is depicted in accordance with an illustrative embodiment. In this illustrative example, device 200 is an example of a device that may be used to implement first device 102, second device 104, or both first device 102 and second device 104 in FIG. 1. The components shown for device 200 may vary if device 200 is implemented only as a receiver or a transmitter.

In this illustrative example, device 200 comprises signal transmitter 202, signal receiver 204, processor unit 206, and storage system 207. These different components are implemented in hardware, software, or a combination of the two.

Signal transmitter 202 is configured to generate and transmit signals 208. In these illustrative examples, signal transmitter 202 may include signal source 210 and state selector 212. Signal source 210 is configured to generate signals 208 in the form of particles 214. The particles may be, for example, photons, electrons, and other suitable particles for transmitting signals.

In these illustrative examples, signal source 210 may take the form of coherent light generator 216. Coherent light generator 216 will be sufficiently weak such that on average less than one photon is emitted for each signal encoding a bit of information.

State selector 212 is configured to set states 218 for types of properties 219 for signals 208. In particular, state selector 212 selects states 218 for particles 214. For example, states 218 may be states for types of properties 219, such as types of polarization of particles 214.

Signal receiver 204 is configured to receive signals 220. In particular, signal receiver 204 is configured to receive particles 222 that form signals 220. Signal receiver 204 includes decoder 224. Further, signal receiver 204 also includes state identifier 226. State identifier 226 is configured to identify states 228 for types of properties 229 for signals 220 received by signal receiver 204.

Decoder 224 is configured to identify bits encoded in signals 220 from states 228 for types of properties 229. In other words, a particular state in states 228 for a particular property in types of properties 229 may represent a particular value for a bit.

In these illustrative examples, processor unit 206 is hardware and may run software. When processor unit 206 runs software to perform operations, processor unit 206 may be a number of processors, a multi-processor core, or some other type of processor, depending on the particular implementation. In other illustrative examples, processor unit 206 may include hardware to perform the operations or may include a combination of hardware and software to perform operations.

Processor unit 206 performs operations for generating bits, generating keys, authenticating, and other suitable processes. These different operations include controlling the operation of signal transmitter 202 and signal receiver 204.

Storage system 207 is configured to store information. This information may be, for example, program code, shared secret keys, session keys, keys, bits, and other suitable information. Storage system 207 is comprised of one or more storage devices. For example, storage system 207 may include at least one of memory, persistent storage, and other suitable types of storage devices. A storage device is any piece of hardware that is capable of storing information either on a temporary basis, a permanent basis, or both on a temporary basis and a permanent basis.

When hardware is employed to implement one or more of the components in device 200, the hardware may include circuits that operate to perform the operations in the components. In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices.

Additionally, the processes may be implemented in organic components integrated with inorganic components and/or may be comprised entirely of organic components excluding a human being. For example, the processes may be implemented as circuits in organic semiconductors.

Instructions for the operating system, applications, and/or programs may be located in storage system 207, which are in communication with processor unit 206. The processes of the different embodiments may be performed by processor unit 206 using computer-implemented instructions, which may be located in a memory in storage system 207.

These instructions are referred to as program code, computer usable program code, or computer readable program code that may be read and executed by a processor in processor unit 206. The program code in the different embodiments may be embodied on different physical or computer readable storage media, such as a memory or a persistent storage in storage system 207.

Program code may be located in a functional form on a computer readable media that is selectively removable and may be loaded onto or transferred onto device 200 for execution by processor unit 206. The program code and the computer readable media form a computer program product in these illustrative examples. In one example, the computer readable media may be a computer readable storage media or a computer readable signal media.

In these illustrative examples, the computer readable storage media is a physical or tangible storage device used to store the program code rather than a medium that propagates or transmits the program code.

Alternatively, the program code may be transferred to device 200 using a computer readable signal media. The computer readable signal media may be, for example, a propagated data signal containing the program code. For example, the computer readable signal media may be an electromagnetic signal, an optical signal, and/or any other suitable type of signal. These signals may be transmitted over communications links, such as wireless communications links, optical fiber cable, coaxial cable, a wire, and/or any other suitable type of communications link.

When device 200 is implemented as just a receiver, device 200 may not need all of the components illustrated in FIG. 2. For example, state selector 212 may be omitted from signal transmitter 202.

The illustrations of information exchange environment 100 in FIG. 1 and device 200 in FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, other devices may be present in addition to first device 102 and second device 104 in information exchange environment 100. For example, information exchange environment 100 may be a network data processing system in which first device 102 and second device 104 are computers. In still other examples, information exchange environment 100 may be a building in which first device 102 is a badge and second device 104 is a badge reader.

In another illustrative example, device 200 may not include state selector 212 if device 200 only performs functions described with respect to first device 102 in FIG. 1. In still other illustrative examples, signal transmitter 202 and signal receiver 204 may be implemented as a single component, such as a single transceiver.

Figure 3:
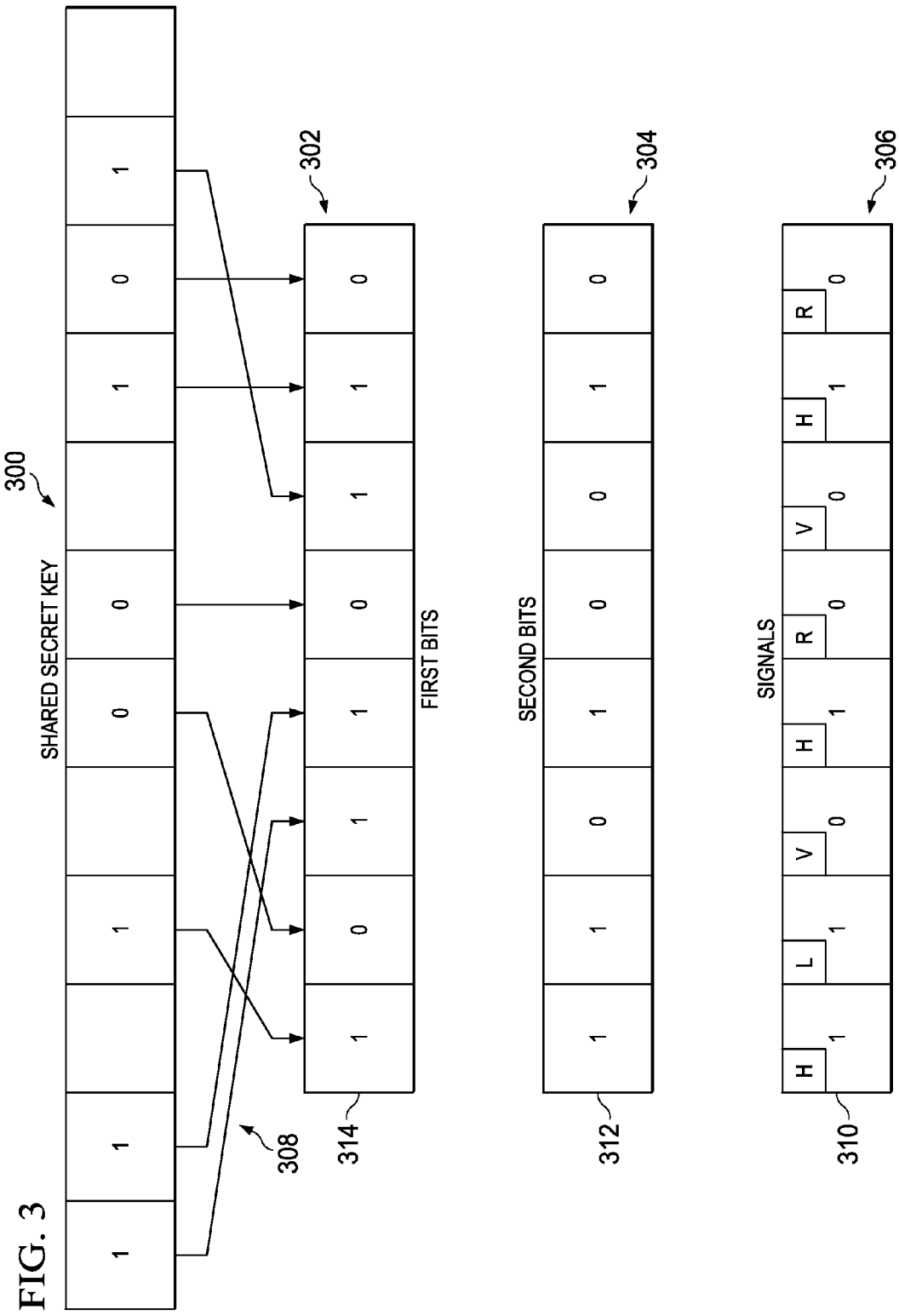
FIG. 3 is an illustration of information used to generate a key in accordance with an illustrative embodiment.

Turning now to FIG. 3, an illustration of information used to generate a key is depicted in accordance with an illustrative embodiment. In this illustrative example, shared secret key 300, first bits 302, second bits 304, and signals 306 are depicted. Shared secret key 300 is an example of shared secret key 114 and shared secret key 116 in FIG. 1. First bits 302 are an example of first bits 118 and first bits 124 in FIG. 1. Second bits 304 are examples of second bits 132 and second bits 140 in FIG. 1. Signals 306 are examples of signals 110 in FIG. 1.

In this illustrative example, first bits 302 and second bits 304 have a selected length of eight bits. Of course, the length of first bits 302 and second bits 304 may be any number, depending on the particular implementation. Only eight bits are shown in this example to avoid obscuring an illustration of the manner in which bits are used in the illustrative examples.

For example, the number of bits selected may be, for example, 400, 1,000, 5,000, or some other suitable number. The number of bits selected for use depends on the number of bits selected for encrypting information. For example, a key that is 128, 192, or 256 bits may be desired. Further, an initialization vector also may be desired to be generated. The initialization vector may be 128 bits. As a result, the total number of bits used may be based on the number of bits that are expected to have expected states when taking into account noise that may cause some bits to have states that change when sent in signals.

Signals 306 are a number of signals equal to the selected length for first bits 302 and second bits 304. In this illustrative example, eight signals are present in signals 306.

In this illustrative example, first bits 302 are generated by selecting bits from shared secret key 300. The selection of bits from shared secret key 300 to form first bits 302 is performed using a selection process, such as a pseudorandom number generator. In one illustrative example, the pseudorandom number generator generates values. These values are used to identify locations of bits in shared secret key 300 for use in first bits 302.

Further, depending on the length of shared secret key 300 and the length desired for first bits 302, other information may also be used to select first bits 302. For example, information already exchanged between the two devices may be used to select first bits 302.

Lines 308 indicate bits in shared secret key 300 selected for use in first bits 302. In these illustrative examples, bits selected from shared secret key 300 are selected from disjoint portions of shared secret key 300, as can be seen in this depicted example.

Second bits 304 are bits that are used to form keys for encryption. In these illustrative examples, second bits 304 are randomly generated bits.

In the depicted example, first bits 302 are used to identify types of properties for signals 306. Second bits 304 are used to set states for signals 306. In other words, the state of a signal for a particular type of property is used to encode a bit in second bits 304. In these illustrative examples, each signal in signals 306 takes the form of a particle, such as a photon.

For example, first bits 302 may be used to select a type of property, such as polarization. For example, if a bit in first bits 302 is a logic 0, the type of polarization is circular polarization. If a bit in first bits 302 is logic 1, the type of polarization is linear polarization.

In the illustration of signals 306, circular polarization is denoted with "C", while linear polarization is denoted with "L". In these illustrative examples, a state depends on the type of polarization. In these examples, when circular polarization is present, "R" denotes right circular polarization, and "L" denotes left circular polarization. When linear polarization is used, "V" denotes vertical polarization, and "H" denotes horizontal polarization.

As depicted, second bits 304 may be encoded into signals 306 using the different states for the different types of polarization. For example, with circular polarization, a logic 0 is represented by right circular polarization, and a logic 1 is represented by left circular polarization. With linear polarization, a logic 0 is represented by vertical polarization, and a logic 1 is represented by horizontal polarization.

For example, signal 310 has linear polarization, because corresponding bit 314 in first bits 302 is a logic 1. The state of signal 310 is horizontal polarization, because corresponding bit 312 in second bits 304 is a logic 1. Further, other properties may be used, depending on the particular implementation. For example, if the particles in signals 306 take the form of electrons, the property may be the spin of electrons, and the state may be spin up and spin down.

When signals 306 are received by a device, the states of signals 306 are examined. Bits encoded in signals 306 are identified based on the state for the types of properties in signals 306. Each bit that has a type of property that matches an expected type of property for the bit in the signal is retained for use in generating a key.

For example, signal 310 in signals 306 encodes a logic 1 based on corresponding bit 312 in second bits 304. The type of property of signal 310 is linear polarization based on corresponding bit 314 in first bits 302.

If signal 310 is received and the identified type of property for signal 310 is horizontal polarization, the logic 1 encoded in signal 310 is identified from the state of signal 310 being horizontal. Additionally, signal 310 is indicated as being correctly received.

If signal 310 has circular polarization, signal 310 does not have the expected type of property. As a result, signal 310 may have been examined by an unauthorized device, or the type of polarization may have been changed due to noise or other environmental conditions. In this case, the bit encoded in signal 310 is not retained.

Whether a bit is received with an expected type of property or not is indicated by the device receiving signal 310 from the device that sent signal 310. The indication may be made in a number of different ways. For example, the device receiving signal 310 may indicate when a signal is received with an expected state, indicate when a signal is received without the expected state, or a combination of the two.

The bits from second bits 304 that are received having types of properties that match expected types of properties are the bits used to generate keys by both of the devices. In this manner, information may be sent to generate a key without exposing or sharing any portions of a shared secret key in these illustrative examples.

The illustration of shared secret key 300, first bits 302, second bits 304, and signals 306 is not meant to limit the manner in which bits may be generated or in which signals may be sent in other illustrative embodiments. For example, a value generated by a pseudorandom number generator may be used to select two adjacent locations instead of a single location in generating first bits 302. Further, second bits 304 may be generated using other processes rather than a random number generator. For example, a pseudorandom number generator may be used in some illustrative examples. In another illustrative example, other types of polarization may be used in place of or in addition to the ones illustrated. For example, elliptical polarization may be used in place of linear polarization or circular polarization as a type of polarization.

Figure 4:
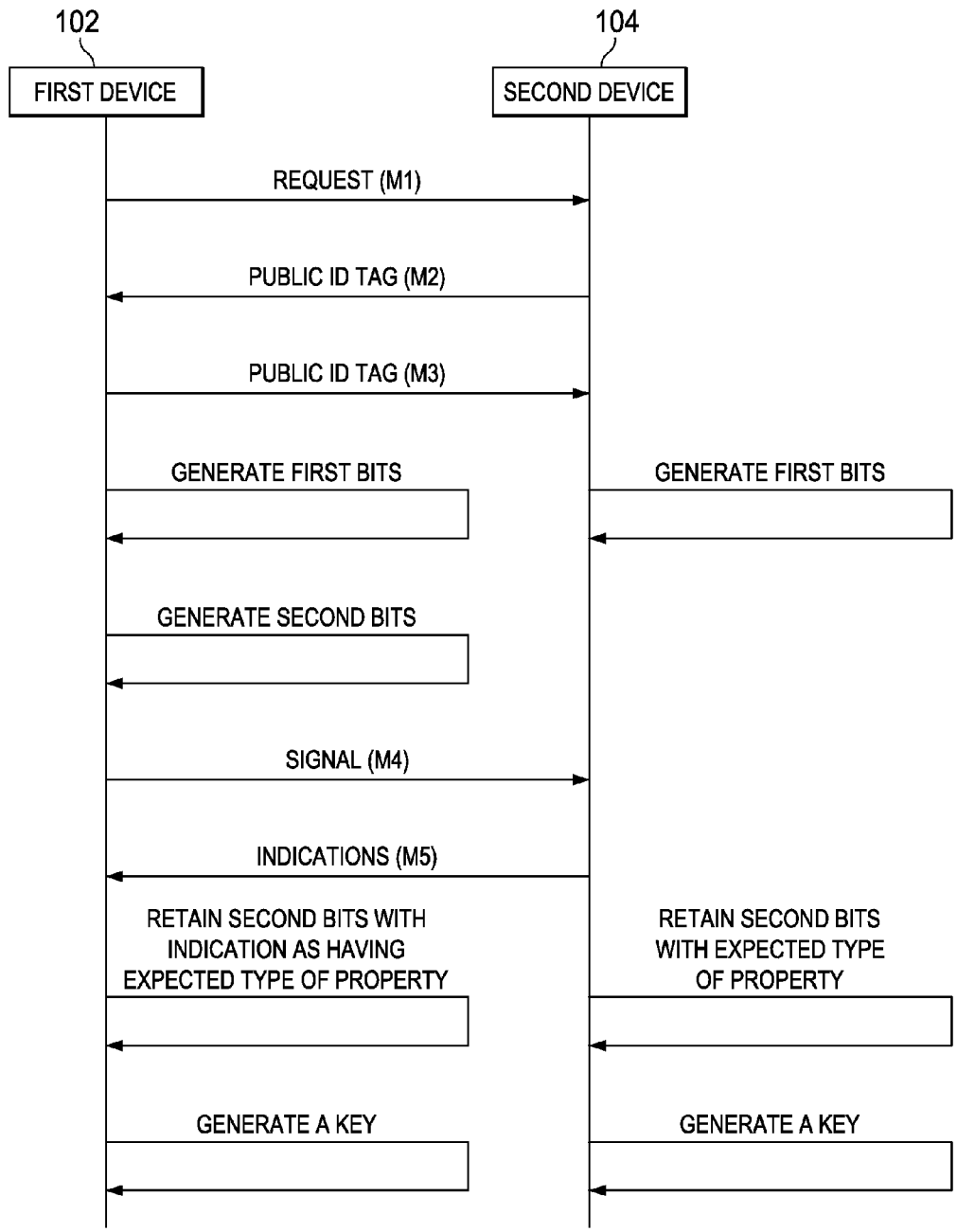
FIG. 4 is an illustration of a message flow diagram of messages used to exchange information in accordance with an illustrative embodiment.

Turning now to FIG. 4, an illustration of a message flow diagram of messages used to exchange information is depicted in accordance with an illustrative embodiment. In this depicted example, the message flow diagram may be implemented in information exchange environment 100 in FIG. 1. In particular, the message flow in this example depicts messages that may be sent between first device 102 and second device 104.

First device 102 sends a request to second device 104 to establish a key for use in exchanging information (message M1). This request may include a start time and the number of signals that will be transmitted to generate a key. This key may be, for example, a session key. In this manner, first device 102 may indicate a start time for transmitting a number of signals. These signals may be in the form of photons.

In response, second device 104 returns a public ID tag for identifying second device 104 (message M2). First device 102 sends a public ID tag for identifying first device 102 (message M3). This exchange of information also may include randomly chosen nonces. The nonces are identifiers for a session in these illustrative examples.

Thereafter, both first device 102 and second device 104 generate first bits. The first bits have a length that is equal to the number of signals that will be sent.

These bits are used to identify types of properties for signals that will be sent from first device 102 to second device 104. In these illustrative examples, the first bits are selected from the shared secret keys that first device 102 and second device 104 have. The first bits generated by first device 102 will match the first bits generated by second device 104 if both devices have the same shared secret key.

First device 102 generates second bits that have a length equal to the first bits generated by first device 102. First device 102 sends the second bits in a signal to second device 104 (message M4). Each of the signals has a type of property based on a corresponding bit in the first bits and a state for the type of property that encodes the second bit that is to be sent.

In response to receiving the signals, second device 104 sends indications identifying each signal that is received having the expected type of property (message M5). First device 102 retains the second bits that have been indicated as having the expected type of property by second device 104. Second device 104 also retains second bits having the expected type of property. Thereafter, first device 102 and second device 104 generate a key using the second bits.

With this process, first device 102 and second device 104 now have keys that may be used to exchange information. Additionally, before generating keys, error correction and privacy amplification may be performed. For example, error correction may be performed with first device 102 computing a set of random parity bits for the data generated by first device 102. This data may be, for example, the expected entropy in data received by second device 104 that is expected to cause noise in the channel and in second device 104. First device 102 may send the parity values and how the parity values were computed to second device 104. Second device 104 may then decode the string of data that matches parity values and is closest to the values measured by second device 104. The data closest to the values may be ones requiring the fewest bit flips. In the illustrative examples, privacy amplification may be performed by randomly choosing a member of a universal hash function family that maps each of their strings of data to a smaller string.

In these illustrative examples, the strings of data are the raw keys extracted by first device 102 and second device 104. In the absence of noise, these keys are the same and may be used. Noise may cause some number of bits to flip. For example, about one percent to about five percent on the bits may not be the same between first device 102 and second device 104. The disagreement may be resolved using error correction. The privacy amplification is performed afterwards to remove correlations revealed by parity bits.

Figure 5:
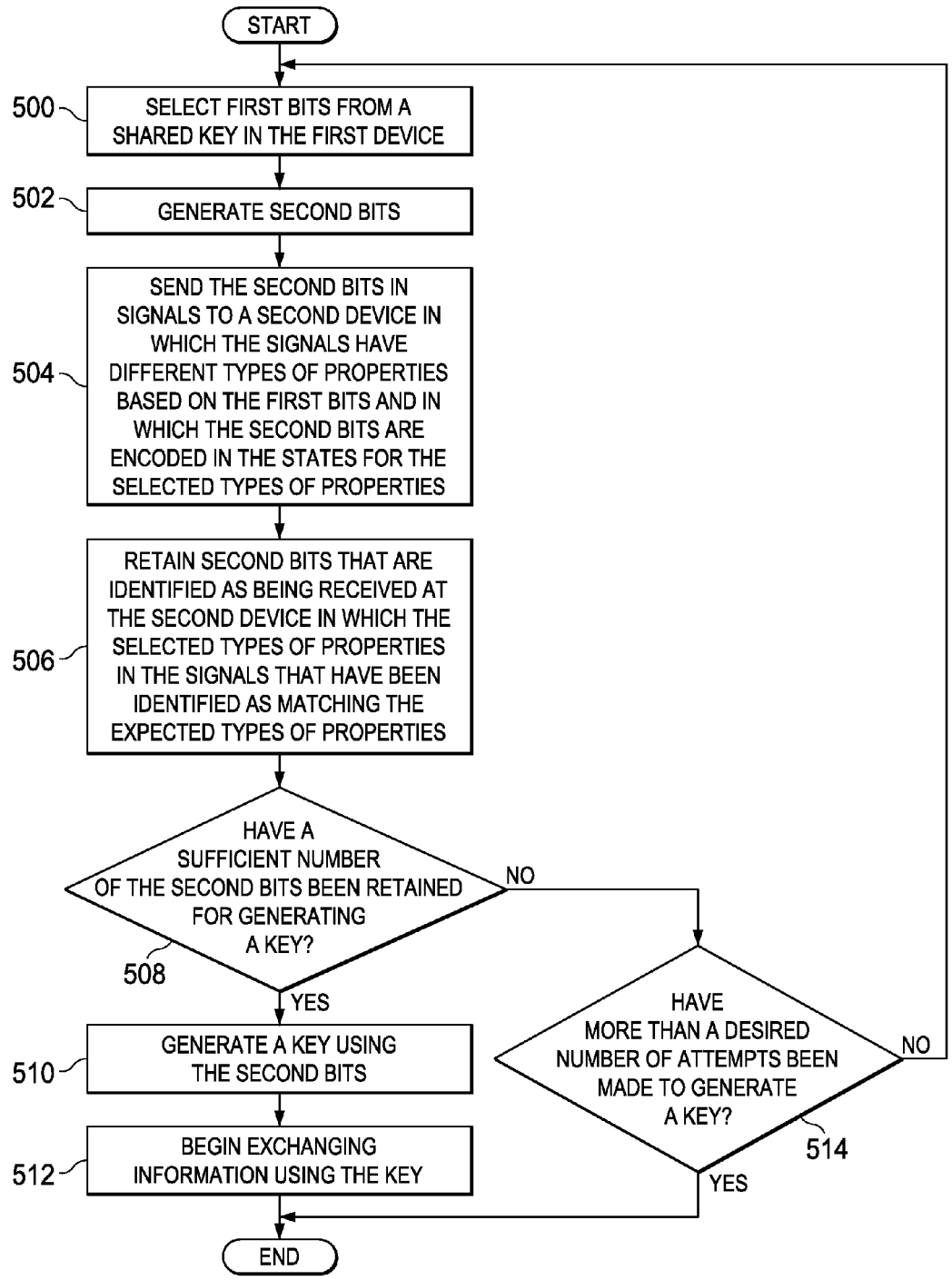
FIG. 5 is an illustration of a flowchart of a process for sharing information in accordance with an illustrative embodiment.

With reference now to FIG. 5, an illustration of a flowchart of a process for sharing information is depicted in accordance with an illustrative embodiment. The process illustrated in FIG. 5 is a high-level flowchart of a process that may be implemented in information exchange environment 100 in FIG. 1. In particular, the different operations illustrated may be implemented in first device 102 in FIG. 1.

The process begins by selecting first bits from a shared key in the first device (operation 500). The process then generates second bits (operation 502). The process then sends the second bits in signals to a second device in which the signals have different types of properties based on the first bits and in which the second bits are encoded in the states for the selected types of properties (operation 504).

Second bits that are identified as being received at the second device in which the selected types of properties in the signals that have been identified as matching the expected types of properties are retained (operation 506).

A determination is made as to whether a sufficient number of the second bits have been retained for generating a key (operation 508). If a sufficient number of the second bits have been retained, the process generates a key using the second bits (operation 510). Thereafter, the process begins exchanging information using the key (operation 512), with the process terminating thereafter.

With reference again to operation 508, if a sufficient number of second bits have not been retained, a determination is made as to whether more than a desired number of attempts have been made to generate a key (operation 514). If more than a desired number of attempts have been made, the process terminates. Otherwise, the process returns to operation 500.

Figure 6:
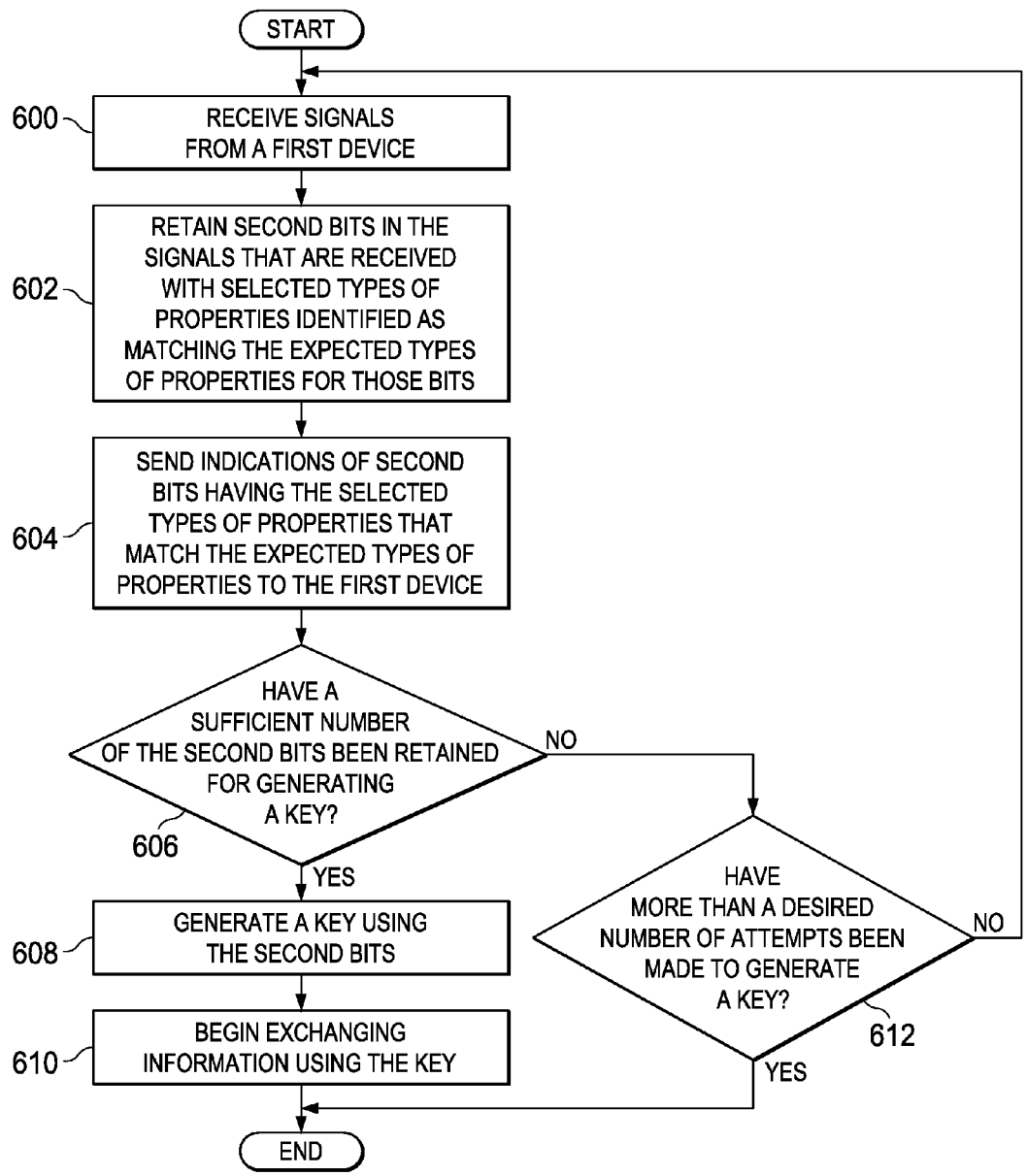
FIG. 6 is an illustration of a flowchart of a process for sharing information in accordance with an illustrative embodiment.

Turning now to FIG. 6, an illustration of a flowchart of a process for sharing information is depicted in accordance with an illustrative embodiment. The process illustrated in FIG. 6 is a high-level flowchart of a process that may be implemented in information exchange environment 100 in FIG. 1. In particular, the different operations illustrated may be implemented in second device 104 in FIG. 1.

The process begins by receiving signals from a first device (operation 600). Second bits in the signals that are received with selected types of properties identified as matching the expected types of properties for those bits are retained (operation 602). Indications of second bits having the selected types of properties that match the expected types of properties are sent to the first device (operation 604).

A determination is made as to whether a sufficient number of the second bits have been retained for generating a key (operation 606). If a sufficient number of the second bits have been retained, the process generates a key using the second bits (operation 608). Thereafter, the process begins exchanging information using the key (operation 610), with the process terminating thereafter.

With reference again to operation 606, if a sufficient number of second bits have not been retained, a determination is made as to whether more than a desired number of attempts have been made to generate a key (operation 612). If more than a desired number of attempts have been made, the process terminates. Otherwise, the process returns to operation 600.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operation 602 and operation 604 may be performed at the same time rather than sequentially, as shown in the flowchart in FIG. 6. As another example, error correction operations also may be performed in these illustrative examples. Other operations, such as initiating the generation of the keys for information exchange, may be included in the different operations described above.

Thus, one or more illustrative embodiments may be used to generate keys and authenticate devices for exchanging information. In these illustrative examples, the shared secret keys are not exposed during the exchange of information using the signals. As a result, shared secret keys may need to be updated less often. The reduction in updates may result in an increase in security in maintaining the shared secret keys.

One or more illustrative embodiments may be used to perform many different types of operations. For example, information exchange may occur between computers or other types of devices on a network. Additionally, information exchange also may be implemented using one or more illustrative embodiments for shorter range information exchange. The shorter range information exchange may include information exchanges between a badge and a badge reader, a debit card and an automated teller machine, a smart phone and a smart dock, and other suitable types of interactions. These interactions may be performed using optical fibers in some illustrative examples. In other illustrative examples, the signals may be sent over a wireless interface or over wires.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for generating keys for exchanging information between devices, the method comprising:
    selecting first bits from a shared secret key by a first processor unit comprising hardware in a first device, where the first bits have a selected length;
    sending second bits with the selected length in signals from the first device to a second device in which the signals have selected types of properties based on the first bits and in which the second bits are encoded in states for the selected types of properties;
    receiving the second bits by the second device;
    selecting third bits from a copy of the shared secret key by a second processor unit comprising hardware in the second device, where the third bits correspond to the first bits from the shared secret key in the first device;
    identifying an expected type of property for each of the second bits by the second device based on the third bits;
    determining for each second bit in the second bits received by the second device whether the second bit has the expected type of property for the second bit;
    sending an indication from the second device to the first device for identifying the second bits received by the second device determined to have the expected type of property;
    generating a first key by the first processor unit in the first device in which the first key is based on the second bits identified by the first device from the indication as having been received at the second device having the expected type of property; and
    generating a second key by the second processor unit in the second device in which the second key is based on the second bits received at the second device having the expected type of property.

2. The method of claim 1 further comprising:
    exchanging information with the second device using the first key.

3. The method of claim 1 further comprising:
    sending a request to the second device to generate the second key.

4. The method of claim 3, wherein the request includes a time when the signals are to be sent and a number of the signals to be sent.

5. The method of claim 1, wherein selecting the first bits from the shared secret key in the first device, wherein the first bits have the selected length comprises:
    selecting the first bits from the shared secret key using a pseudorandom process in the first device.

6. The method of claim 5, wherein selecting the third bits comprises:
    selecting the third bits from the copy of the shared secret key in the second device using the pseudorandom process in the second device.

7. The method of claim 1 further comprising:
    randomly selecting the second bits with the selected length.

8. The method of claim 1, wherein generating the first key in the first device comprises:
    applying a hash function in the first device to the second bits identified as having been received at the second device having the expected type of property.

9. The method of claim 1, wherein sending the second bits with the selected length in the signals from the first device to the second device in which the signals have the selected types of properties based on the first bits and in which the second bits are encoded in the states for the selected types of properties comprises:

sending the second bits with the selected length in the signals to the second device in which a bit in the second bits is encoded in a photon and wherein the photon has a selected type of property based on the first bits and a selected state of the selected type of property is set based on a value of the bit.

10. The method of claim 1, wherein the signals are comprised of particles selected from at least one of photons and electrons.

11. The method of claim 1, wherein the second device is selected from one of a computer, a mobile phone, a card reader, a smart dock, and a badge reader.

12. An apparatus, comprising:

a first processor unit comprising hardware in a first device configured to select first bits from a shared secret key, where the first bits have a selected length;

a signal transmitter in the first device configured to send second bits with the selected length in signals from the first device to a second device in which the signals have selected types of properties based on the first bits and in which the second bits are encoded in states for the selected types of properties;

a signal receiver in the second device configured to receive the second bits by the second device;

a second processor unit comprising hardware in the second device configured to select third bits from a copy of the shared secret key, where the third bits correspond to the first bits from the shared secret key in the first device, and to identify an expected type of property for each of the second bits by the second device based on the third bits;

where the second device is configured to determine for each second bit in the second bits received by the second device whether the second bit has the expected type of property for the second bit and to send an indication from the second device to the first device for identifying the second bits received by the second device determined to have the expected type of property;

where the first processor unit in the first device is configured to generate a first key in which the first key is based on the second bits identified by the first device from the indication as having been received at the second device having the expected type of property; and where the second processor unit in the second device is configured to generate a second key in the second device in which the second key is based on the second bits received at the second device having the expected type of property.

13. The apparatus of claim 12, wherein the first device is configured to send a request to the second device to generate the second key.

14. The apparatus of claim 13, wherein the request includes a time when the signals are to be sent and a number of the signals to be sent.

15. The apparatus of claim 12, wherein the first processor unit in the first device is configured to select the first bits from the shared secret key using a pseudorandom process.

16. The apparatus of claim 12, wherein the first processor unit in the first device is configured to randomly select the second bits with the selected length.

17. The apparatus of claim 12, wherein the first processor unit in the first device is configured to apply a hash function to the second bits identified as having been received at the second device having the expected type of property to generate the first key.

18. The apparatus of claim 12, wherein the signal transmitter in the first device is configured to send the second bits with the selected length in the signals to the second device in which a bit in the second bits is encoded in a photon and wherein the photon has a selected type of property based on the first bits and a selected state of the selected type of property is set based on a value of the bit.

19. The apparatus of claim 12, wherein the signals are comprised of particles selected from at least one of photons and electrons.

20. The apparatus of claim 12, wherein the second device is selected from one of a computer, a mobile phone, a card reader, a smart dock, and a badge reader.

\* \* \* \* \*